United States Patent
Schmitt et al.

(10) Patent No.: US 7,419,619 B2
(45) Date of Patent: Sep. 2, 2008

(54) MIXTURES FOR PRODUCING TRANSPARENT PLASTICS, TRANSPARENT PLASTICS AND METHOD FOR THEIR PRODUCTION AND USE

(75) Inventors: Bardo Schmitt, Mainz (DE); Patrik Hartmann, Buettelborn (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 10/588,210

(22) PCT Filed: Jan. 19, 2005

(86) PCT No.: PCT/EP2005/000464

§ 371 (c)(1),
(2), (4) Date: Aug. 2, 2006

(87) PCT Pub. No.: WO2005/097852

PCT Pub. Date: Oct. 20, 2005

(65) Prior Publication Data

US 2007/0135560 A1    Jun. 14, 2007

(30) Foreign Application Priority Data

Apr. 7, 2004  (DE) ........................ 10 2004 017 574

(51) Int. Cl.
  *C09K 3/00*  (2006.01)
(52) U.S. Cl. ........................... 252/182.17; 252/182.18; 252/182.23; 252/182.28; 252/183.11
(58) Field of Classification Search ............ 252/182.17, 252/182.18, 182.28, 182.23, 183.11
See application file for complete search history.

(56) References Cited

U.S. PATENT DOCUMENTS 5,270,439 A * 12/1993 Maruyama et al. .......... 528/373
6,342,571 B1 * 1/2002 Smith et al. ................. 526/286
6,698,883 B2 * 3/2004 Momoda et al. ............ 351/162

FOREIGN PATENT DOCUMENTS

| EP | 0 592 935 | 4/1994 |
| WO | 03 011925 | 2/2003 |
| WO | 03 011926 | 2/2003 |

OTHER PUBLICATIONS

U.S. Appl. No. 10/588,210, filed Aug. 2, 2006, Schmitt, et al.
U.S. Appl. No. 10/587,257, filed Jul. 26, 2006, Schmitt, et al.
U.S. Appl. No. 11/547,238, filed Oct. 3, 2006, Schmitt, et al.

* cited by examiner

*Primary Examiner*—Vasu Jagannathan
*Assistant Examiner*—Karuna P Reddy
(74) *Attorney, Agent, or Firm*—Oblon, Spivak, McClelland, Maier & Neustadt, P.C.

(57) ABSTRACT

The invention relates to mixtures for producing transparent plastics, comprising a) a prepolymer, produced from the compounds of formulae (I) and (II), wherein $R^1$ independently represents hydrogen or a methyl group, $R^2$ independently represents a linear or branched, aliphatic or cycloaliphatic group or a substituted or unsubstituted aromatic or heteroaromatic group and m and n independently represent an integer greater or equal 0, with m+1>0, and compounds of formula (III), alkyldithiols or polythiols, preferably HS—$R^3$—SH (III), wherein $R^3$ is equal or different from $R^2$ and can have the meaning indicated in $R^2$, and b) at least one radically polymerizable monomer (A) having at least two methacrylate groups and c) aromatic vinyl compounds, such as styrene and d) optionally a radically polymerizable monomer having at least two terminal olefinic groups that have different reactivity, and/or e) optionally at least one monomer (B) from the group of methacrylates, preferably 2-hydroxyethylmethacrylate.

29 Claims, No Drawings

MIXTURES FOR PRODUCING TRANSPARENT PLASTICS, TRANSPARENT PLASTICS AND METHOD FOR THEIR PRODUCTION AND USE

The present invention relates to mixtures for producing transparent plastics. Further, the present invention relates to transparent plastics which can be produced from the mixtures, and methods for their production. Further, the present invention relates to the use of transparent plastics for the production of optical, in particular ophthalmic, lenses.

Nowadays, everyday life without spectacles is no longer imaginable. In particular, spectacles with plastic lenses have recently gained in importance, since they are lighter and less breakable than spectacle lenses of inorganic materials and can be colored with suitable dyes. For the production of plastic spectacle lenses, highly transparent plastics are generally used, which can for example be obtained starting from diethylene glycol bis(allyl)-carbonate (DAC), thiourethane compounds with α,ω-terminated multiple bonds or sulfur-containing (meth)acrylates.

DAC has very good impact resistance, transparency and good processability. However, a disadvantage is that on account of the relatively low refractive index $n_D$ of ca. 1.50 both the center and also the edges of the plastic lenses in question have to be reinforced, so that the spectacle lenses are correspondingly thick and heavy. The wearing comfort of spectacles with DAC plastic lenses is therefore markedly diminished.

The publication DE 4234251 discloses sulfur-containing polymethacrylates, which are obtained by radical copolymerization of a monomer mixture of compounds of the formula (1) and (2).

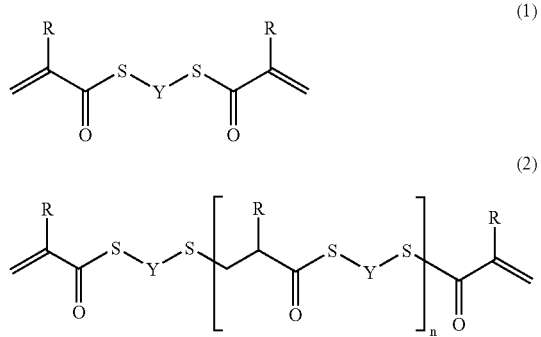

Here Y designates for an optionally branched, optionally cyclic alkyl residue with 2 to 12 carbon atoms or an aryl residue with 6 to 14 carbon atoms or an alkaryl residue with 7 to 20 carbon atoms, wherein the carbon chains can be interrupted by one or several ether or thioether groups, R stands for hydrogen or methyl and n is a whole number in the range from 1 to 6.

According to DE 4234251, the monomers of the formula (1) and (2) are generally in a molar ratio of 1:0.5 to 0.5:1. The production of the monomer mixture is effected by reaction of at least two moles of (meth)acryloyl chloride or (meth)acrylic anhydride with one mole of a dithiol, wherein the (meth)acryloyl chloride or (meth)acrylic anhydride are reacted in an inert organic solvent and the dithiol in aqueous solution. As suitable solvents, methyl tert.butyl ether, toluene and xylene are named, the dielectric constants whereof at 20° C. are 2.6, 2.4 and 2.3 to 2.6 respectively.

The plastics described in DE 4234251 are colorless, hard and slightly brittle and have a high refractive index $n_D$ in the range from 1.602 to 1.608. The Abbé number is between 35 and 38. Hence these plastics are also only suitable for spectacle lenses to a limited extent. Information on the glass transition temperature of the plastics can also not be gained from this publication.

In the publication WO 03/011925, the polymerization of thiomethacrylates with polyethylene glycol derivatives is described. The plastics produced from this can inter alia be used for the production of optical lenses. The disadvantage with these lenses is their mechanical properties. Thus in particular the impact resistance does not suffice for many requirements.

In view of the state of the technology, the purpose of the present invention was now to make available mixtures for the production of transparent plastics which are suitable as material for optical lenses, where the plastics have mechanical properties which are as good as possible, in particular a high impact resistance and at the same time a high refractive index, preferably greater than 1.59 and as high as possible an Abbé number, preferably greater than 36. In particular, it should be possible to produce plastic spectacle lenses which display low dispersion and no color fringes.

The present invention was also based on the purpose of making accessible an educt composition for the production of a highly transparent plastic with improved mechanical properties even at temperatures above room temperature. In particular, the plastic according to the invention should have as high as possible a glass transition temperature, preferably greater than 80.0° C.

A purpose of the present invention was thus to describe a highly transparent plastic, which can be simply and inexpensively produced on the industrial scale starting from the educt composition. In particular, it should be obtainable via free radical polymerization starting from a mixture which is free-flowing at normal pressure and temperatures in the range from 20.0° C. to 80.0° C.

The present invention was also based on the purpose of describing application fields and possible uses of the highly transparent plastic according to the invention.

These and other not explicitly mentioned purposes, but which are readily deducible or inferable from the contexts discussed herein, were achieved by means of a mixture with all the features of patent claim 1. Advantageous modifications of the mixture according to the invention are placed under protection in the subclaims referring back to claim 1. In addition to these, the highly transparent plastics obtainable from the mixtures according to the invention and processes for their production are also claimed. The use category claim protects a preferred use of the highly transparent plastic according to the invention. An optical, preferably ophthalmic lens which contains the highly transparent according to the invention is described in a further patent claim.

Mixtures comprising
a) a prepolymer produced from compounds of the formula (I) and (II)

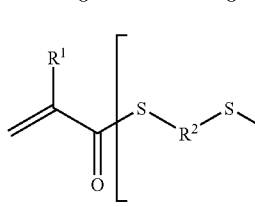

(I)

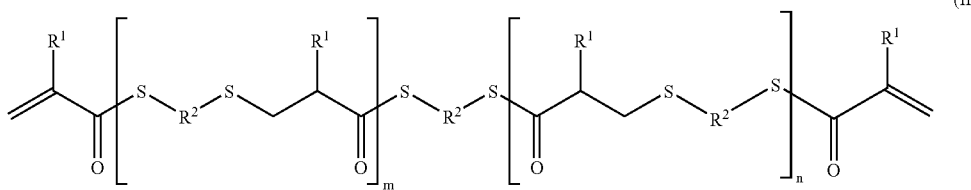

(II)

wherein $R^1$ each independently of one another means hydrogen or a methyl residue, $R^2$ each independently of one another means a linear or branched, aliphatic or cycloaliphatic residue or a substituted or unsubstituted aromatic or heteroaromatic residue and m and n each independently of one another mean a whole number greater than or equal to 0 with m+n>0, and alkyldithiols or polythiols, preferably compounds of the formula (III)

$$HS-R^3-SH \quad (III)$$

wherein $R^3$ can be the same or different from the meaning given in $R^2$ b) at least one radical polymerizable monomer (A) with at least two methacrylate groups and c) aromatic vinyl compounds, which are suitable for the production of transparent plastics and which have outstanding mechanical and optical properties. The mixtures can optionally contain d) a radical polymerizable monomer with at least two terminal olefinic groups, which differ in their reactivity, such as is for example the case with a bifunctional monomer with methacrylate terminal group and a vinyl terminal group and/or e) at least one ethylenically unsaturated monomer (B), preferably from the group of the methacrylates, especially preferably 2-hydroxyethyl methacrylate.

The transparent plastic according to the invention displays a previously unknown combination of outstanding properties, such as a high refractive index, a high Abbé number, good impact resistance and a high glass transition temperature. The corresponding plastic spectacle lenses show low dispersion; no color fringes can be observed.

At the same time, the transparent plastic according to the invention has further advantages, such as that:

Because of the high refractive index of the plastic according to the invention, reinforcement and thus thickening of the center and the edges of corresponding plastic spectacle lenses is not necessary, and the wearing comfort of such spectacles is markedly increased because of the comparatively low weight.

The very good impact resistance of the plastic according to the invention protects the corresponding plastic spectacle lenses from "everyday risks". Damage or irreparable destruction, in particular of the thin spectacle lenses through the action of mechanical force is for the most part prevented.

The highly transparent plastic according to the invention displays a high glass transition temperature, preferably greater than 80.0° C., and thus retains its outstanding mechanical properties, in particular the high impact resistance and its hardness, up to this temperature.

The highly transparent plastic according to the invention can be simply and inexpensively produced on the industrial scale by free radical copolymerization of a monomer mixture which is preferably free-flowing at normal pressure and temperatures in the range from 20.0° C. to 80.0° C.

The production of the underlying monomer mixture is likewise simply and inexpensively possible on the industrial scale.

The prepolymer of the present invention includes compounds of the formula (I) and/or (II) and (III).

(I)

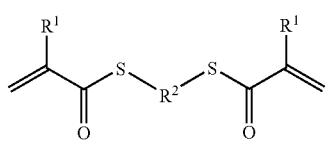

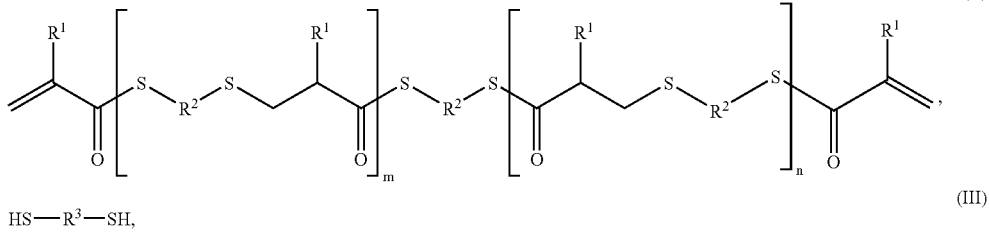

HS—R³—SH, wherein the residue R¹ each independently of one another designates hydrogen or a methyl residue, preferably a methyl residue and the residue R² each independently of one another designates a linear or branched, aliphatic or cycloaliphatic residue or a substituted or unsubstituted aromatic or hetero-aromatic residue, where the residue R² can preferably include 1 to 100, in particular 1 to 20 carbon atoms, and wherein the residue R³ each independently of R² means a linear or branched, aliphatic or cycloaliphatic residue or a substituted or unsubstituted aromatic or heteroaromatic residue, wherein the residue R³ can preferably include 1 to 100, in particular 1 to 20 carbon atoms.

The preferred linear or branched, aliphatic or cyclo-aliphatic residues for example include the methylene, ethylene, propylene, iso-propylene, n-butylene, iso-butylene, tert.-butylene or cyclohexylene group.

The preferred divalent aromatic or heteroaromatic residues in particular include groups which are derived from benzene, naphthalene, biphenyl, diphenyl ether, diphenyl-methane, diphenyldimethylmethane, bisphenone, diphenyl sulfone, quinoline, pyridine, anthracene and phenanthrene. Also, in the context of the present invention, cyclo-aliphatic residues also include bi-, tri- and polycyclic aliphatic residues.

Further, the residue R² or R³ also includes residues of the formula

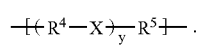   (Ia)

wherein R⁴ each independently of one another is a linear or branched, aliphatic or cycloaliphatic residue, such as for example a methylene, ethylene, propylene, iso-propylene, n-butylene, iso-butylene, tert.-butylene or cyclohexylene group. The residue X is each independently of one another oxygen or sulfur and the residue R⁵ stands for a linear or branched, aliphatic or cycloaliphatic residue, such as for example a methylene, ethylene, propylene, iso-propylene, n-butylene, iso-butylene, tert.-butylene or cyclohexylene group. Also, in the context of the present invention, cycloaliphatic residues also include bi-, tri- and poly-cyclic aliphatic residues. y is a whole number between 1 and 10, in particular 1, 2, 3 and 4.

Preferred residues of the formula (Ia) include:

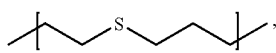

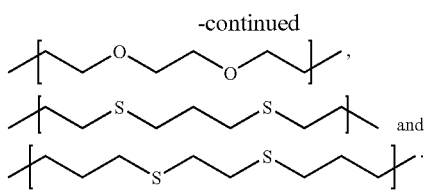

The residue R² is preferably an aliphatic residue with 1 to 10 carbon atoms, preferably a linear aliphatic residue with 2 to 8 carbon atoms.

The indices m and n are each independently of one another a whole number greater than or equal to 0, for example 0, 1, 2, 3, 4, 5 or 6. Here the sum m+n is greater than 0, preferably in the range from 1 to 6, advantageously in the range from 1 to 4, in particular 1, 2 or 3.

The compounds of the formula (I) and (II) and the compounds of the formula (III) respectively can be used individually or as a mixture of several compounds of the formula (I), (II) or (III) for the production of the prepolymer.

The relative contents of the compounds of the formula (I), (II) and (III) in the monomer mixture according to the invention are in principle arbitrary, and they can be used to "tailor-make" the properties profile of the plastic according to the invention in accordance with the requirements of the use. For example, it can be extremely useful that the monomer mixture contain a marked excess of compound(s) of the formula (I) or compound(s) of the formula (II) or compound(s) of the formula (III), each based on the total quantity of the compounds of the formula (I), (II) and (III) in the prepolymer.

However, for the purposes of the present invention it is particularly favorable that the mixture contain more than 10 mol. %, preferably more than 12 mol. %, in particular more than 14 mol. %, based on the total quantity of the compounds of the formula (I) and (II), of compounds of the formula (II) with m+n=2. If R² is an ethylene residue, then the content by weight of (II) with m+n=2 in the mixture is more than 10%, in particular more than 15%.

Further, it is particularly favorable according to the invention to use mixtures that contain more than 5.8 mol. %, advantageously more than 6.5 mol. %, in particular more than 7.5 mol. %, based on the total quantity of the compounds of the formula (I) and (II), of compounds of the formula (II) with m+n=3. This corresponds to a content by weight of (II) with m+n=3, if R² is an ethylene residue, of at least 6%.

The content of the compounds (I) is preferably 0.1 to 50.0 mol. %, advantageously 10.0 to 45.0 mol. %, in particular 20.0 to 35.0 mol. %, based on the total quantity of the compounds of the formula (I) and (II), which corresponds to a preferred range of the content by weight of the compound (I), when R² is an ethylene residue, of 15 to 40%. The content of %, advantageously 5 to 35.0 mol. %, in particular 10 to 30 mol. %, based on the total quantity of the compounds of the formula (I) and (II). This corresponds to a content by weight of the compounds (II) with m+n=1, when $R^2$ is an ethylene residue, of preferably 10 to 45%. The content of the compounds (II) with m+n>3 is preferably greater than 0 mol. %, advantageously greater than 1 mol. %, in particular greater than 2 mol. %, based on the total quantity of the compounds of the formula (I) and (II). If $R^2$ is an ethylene residue, the content by weight for compounds (II) with m+n>3 in the mixture is more than 2%, in particular more than 5%.

The content of the compounds (III) in the prepolymer is preferably 1 to 55.0 mol. %, in particular 10.0 to 50.0 mol. %, based on the total quantity of the compounds of the formula (I), (II) and (III). If in the special case $R^3$ is a dimercaptodioxaoctane residue, the content by weight of (III) in the prepolymer based on the total quantity of the compounds (I), (II) and (III) is more than 0.5%, preferably more than 5%.

Processes for the production of the compounds of the formulae (I) and (II) are known to the skilled person for example from DE 4234251, reference to the disclosure whereof is hereby explicitly made.

Nonetheless in the context of the present invention it has been found quite especially favorable to produce a mixture of the compounds of the formula (I) and (II) by a process wherein 1.0 to <2.0 mol, preferably 1.1 to 1.8 mol, advantageously 1.2 to 1.6 mol, in particular 1.2 to 1.5 mol, of at least one compound of the formula (IV)

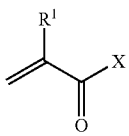
(IV)

is reacted with one mole of at least one polyol of the formula (V)

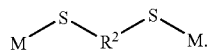
(V)

The residue X stands for halogen, in particular chlorine or bromine or for a

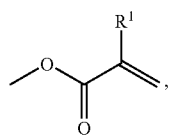

residue, i.e. the compounds of the formula (IV) include inter alia acryloyl chloride, methacryloyl chloride, acrylic anhydride and methacrylic anhydride, the use of acrylic anhydride, methacrylic anhydride or mixtures of the two being particularly preferable.

M each independently of one another designates hydrogen or a metal cation. Preferred metal cations are derived from elements with an electronegativity less than 2.0, advantageously less than 1.5, alkali metal cations, in particular Na$^+$, K$^+$, Rb$^+$ and Cs$^+$ and alkaline earth metal cations, in particular Mg$^{2+}$, Ca$^{2+}$, Sr$^{2+}$ and Ba$^{2+}$ being particularly preferable. Quite especially favorable results can be achieved with the metal cations Na$^+$ and K$^+$.

In this connection, particularly suitable polythiols of the formula (V) include 1,2-ethanedithiol, 1,2-propanedithiol, 1,3-propanedithiol, 1,2-butanedithiol, 1,3-butanedithiol, 1,4-butanedithiol, 2-methylpropane-1,2-dithiol, 2-methyl-propane-1,3-dithiol, 3,6-dioxa-1,8-octanedithiol (dimercaptodioxaoctane=DMDO), ethylcyclohexyldimercaptans which are obtainable by reaction of 4-ethenylcyclohexene with hydrogen sulfide, ortho-bis(mercaptomethyl)benzene, meta-bis(mercaptomethyl)benzene, para-bis(mercaptomethyl)-benzene, compounds of the formula (V)

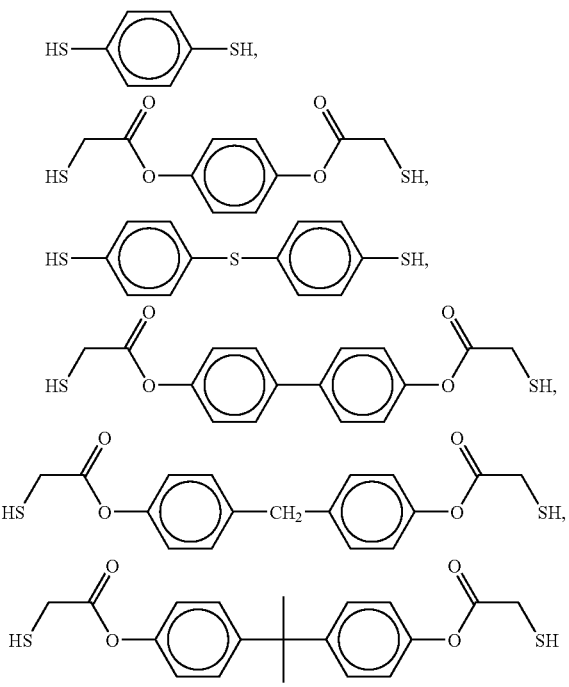

and compounds of the formula

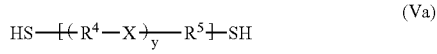
(Va)

where $R^4$ each independently of one another is a linear or branched, aliphatic or cycloaliphatic residue, such as for example a methylene, ethylene, propylene, iso-propylene, n-butylene, iso-butylene, tert.-butylene or cyclohexylene group. Also, in the sense of the present invention, cycloaliphatic residues also include bi-, tri- and polycyclic aliphatic residues. The residue X each independently of one another is oxygen or sulfur and the residue $R^5$ stands for a linear or branched, aliphatic or cycloaliphatic residue, such as for example a methylene, ethylene, propylene, iso-propylene, n-butylene, iso-butylene, tert.-butylene or cyclohexylene group. Also, in the sense of the present invention, cycloaliphatic residues also include bi-, tri- and polycyclic aliphatic residues. y is a whole number between 1 and 10, in particular 1, 2, 3 and 4.

Preferred compounds of the formula (Va) include:

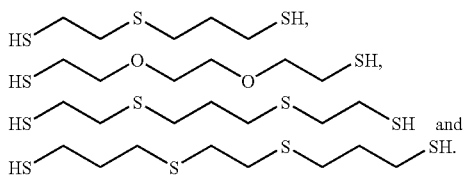

In the context of a quite especially preferred embodiment of this process, 1,2-ethanedithiol is used as the compound of the formula (V).

According to this process, the compound(s) of the formula (IV) in at least one inert, organic solvent L and the compound(s) of the formula (V) in aqueous-alkaline solution are reacted, the term "inert, organic solvent" standing for such organic solvents as do not react with the compounds present in the reaction system under the given reaction conditions.

Preferably at least one solvent L has a relative dielectric constant >2.6, preferably >3.0, advantageously >4.0, in particular >5.0, each measured at 20° C. In this connection, the relative dielectric constant designates a dimensionless number which states by how many times the capacity C of a condenser (theoretically) situated in a vacuum is increased when substances with dielectric properties, so-called dielectrics, are placed between the plates.

This value is measured at 20° C. and extrapolated to low frequencies ($\omega \rightarrow 0$). For further details, reference is made to the current specialist literature, in particular to Ullmann's Encyclopedia of Industrial Chemistry, Vol. 2/1 Application of physical and physical chemical methods in the laboratory, keyword: Dielectric constants, pp. 455-479. Dielectric constants of solvents are inter alia quoted in the Handbook of Chemistry and Physics, 71$^{st}$ Edition, CRC Press, Baco Raton, Ann Arbor, Boston, 1990-1991, pp. 8-44, 8-46 and 9-9 to 9-12.

In the context of this process, it is further particularly advantageous if the solvent and the aqueous solution form two phases during the reaction and are not homogeneously miscible. For this purpose, the solvent preferably has a water solubility, measured at 20° C., less than 10 g of water based on 100 g of solvent.

Solvents L preferred according to the invention include aliphatic ethers such as diethyl ether (4.335), dipropyl ether, diisopropyl ether, cycloaliphatic ethers such as tetrahydrofuran (7.6);

aliphatic esters such as methyl formate (8.5), ethyl formate, propyl formate, methyl acetate, ethyl acetate, n-butyl acetate (5.01), methyl propionate, methyl butyrate (5.6), ethyl butyrate, 2-methoxyethyl acetate; aromatic esters such as benzyl acetate, dimethyl phthalate, methyl benzoate (6.59), ethyl benzoate (6.02), methyl salicylate, ethyl salicylate, phenyl acetate (5.23);

aliphatic ketones such as acetone, methyl ethyl ketone (18.5), pentan-2-one (15.4), pentan-3-one (17.0), methyl isoamyl ketone, methyl isobutyl ketone (13.1); aromatic ketones such as acetophenone;

nitroaromatics such as nitrobenzene, o-nitrotoluene (27.4), m-nitrotoluene (23), p-nitrotoluene;

halogenated aromatics such as chlorobenzene (5.708), o-chlorotoluene (4.45), m-chlorotoluene (5.55), p-chlorotoluene (6.08), o-dichlorobenzene, m-dichlorobenzene;

heteroaromatics such as pyridine, 2-methylpyridine (9.8), quinoline, isoquinoline;

or mixtures of these compounds, where the information the brackets are the respective applicable relative dielectric constants at 20° C.

Here, for the purposes of the present process, aliphatic esters and cycloaliphatic esters, in particular ethyl acetate and tetrahydrofuran are quite especially suitable.

In the context of the present invention, the solvent L can be used both alone and also as a solvent mixture, wherein not all solvents contained in the mixture have to fulfill the above dielectricity criterion. For example, tetrahydro-furan/cyclohexane mixtures can also be used according to the invention. However, it has been found advantageous that the solvent mixture displays a relative dielectric constant >2.6, preferably >3.0, advantageously >4.0, in particular >5.0, each measured at 20° C. Especially advantageous results can be achieved with solvent mixtures which only contain solvents with a relative dielectric constant >2.6, preferably >3.0, advantageously >4.0, in particular >5.0, each measured at 20° C.

The aqueous alkaline solution of the compound(s) of the formula (V) preferably contains 1.1 to 1.5 val (equivalents) of at least one Bronsted base, based on the total quantity of compound(s) of the formula (IV). Preferred Bronsted bases in the sense of the present invention include alkali metal hydroxides and alkaline earth metal hydroxides, in particular sodium hydroxide and potassium hydroxide.

The reaction can in principle be performed in any possible manner, for example it is possible to take the compound(s) of the formula (IV) in the solvent (mixture) L and add the aqueous-alkaline solution of the compound(s) of the formula (V) stepwise or continuously. However, in the context of the present invention it has been found particularly favorable to feed the compound(s) of the formula (IV) in at least one inert, organic solvent L and the compound(s) of the formula (V) in aqueous-alkaline solution into the reaction vessel in parallel.

The reaction temperature can be varied over a wide range, but the temperature often lies in the range from 20.0° C. to 120.0° C., preferably in the range from 20.0° C. to 80.0° C. The same applies for the pressure at which the reaction is carried out. Thus the reaction can take place both under decreased pressure and also under increased pressure. It is however preferably performed at normal pressure. Although the reaction can also take place in air, it has been found particularly favorable in the context of the present invention to perform the reaction under a protective gas atmosphere, preferably nitrogen and/or argon, wherein a small oxygen content is preferably present.

Advantageously, the reaction mixture is treated with a Bronsted acid in a further step, preferably until the aqueous solution at 20° C. displays a pH value less than 7.0, advantageously less than 6.0, in particular less than 5.0. Usable acids in this connection include inorganic mineral acids such as hydrochloric acid, sulfuric acid and phosphoric acid, organic acids such as acetic acid and propionic acid, and acid ion exchangers, in particular acid synthetic resin ion exchangers, such as for example ®Dowex M-31 (H). Here the use of acid synthetic resin ion exchangers with loadings of at least 1.0 meq, preferably at least 2.0 meq, in particular at least 4.0 meq, $H^+$ ions based on 1 g of dried ion exchanger, particle sizes of 10-50 mesh and porosities in the range from 10 to 50% based on the total volume of the ion exchanger has proved quite especially effective.

For the isolation of the compounds of the formula (I) and (II), the organic phase consisting of the solvent L is advantageously separated, washed if necessary, dried and the solvent evaporated.

In the reaction of the compound(s) of the formula (IV) with the compound(s) of the formula (V), inhibitors can be added, which prevent radical polymerization of the (meth)acryl groups during the reaction. These inhibitors are widely known in the specialist field.

1,4-dihydroxybenzene is mainly used. However, differently substituted dihydroxybenzenes can also be used. In general such inhibitors can be described by the general formula (VI)

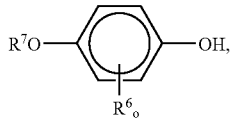

(VI)

wherein $R^6$ is a linear or branched alkyl residue with one to eight carbon atoms, halogen or aryl, preferably an alkyl residue with one to four carbon atoms, particularly preferably methyl, ethyl, n-propyl, iso-propyl, n-butyl, iso-butyl, sec-butyl, tert.-butyl, Cl, F or Br;

o is a whole number in the range from one to four, preferably one or two; and $R^7$ means hydrogen, a linear or branched alkyl residue with one to eight carbon atoms or aryl, preferably an alkyl residue with one to four carbon atoms, particularly preferably methyl, ethyl, n-propyl, iso-propyl, n-butyl, iso-butyl, sec-butyl or tert.-butyl.

However compounds with 1,4-benzoquinone as the parent compound can also be used. These can be described by the formula (VII)

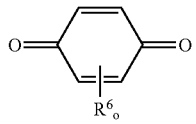

(VII)

wherein $R^6$ and o have the meaning stated above.

Likewise phenols of the general structure (VIII) are used

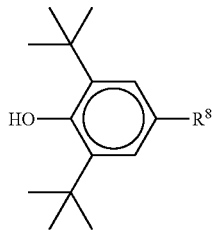

(VIII)

wherein $R^8$ means a linear or branched alkyl residue with one to eight carbon atoms, aryl or aralkyl, propionate ester with 1 to 4-hydric alcohols, which can also contain hetero atoms such as S, O and N, preferably an alkyl residue with one to four carbon atoms, particularly preferably methyl, ethyl, n-propyl, iso-propyl, n-butyl, iso-butyl, sec-butyl or tert.-butyl.

A further advantageous class of substances is represented by hindered phenols based on triazine derivatives of the formula (IX)

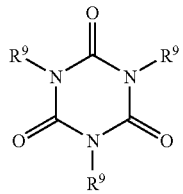

(IX)

with $R^9$=compound of the formula (X)

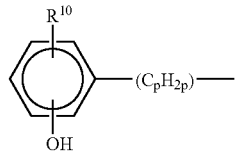

(X)

wherein $R^{10}=C_pH_{2p+1}$ with p=1 or 2.

The compounds 1,4-dihydroxybenzene, 4-methoxyphenol, 2,5-dichloro-3,6-dihydroxy-1,4-benzoquinone, 1,3,5-trimethyl-2,4,6-tris-(3,5-di-tert.-butyl-4-hydroxybenzyl) benzene, 2,6-di-tert.-butyl-4-methylphenol, 2,4-dimethyl-6-tert.-butylphenol, 2,2-bis[3,5-bis(1,1-dimethylethyl)-4-hydroxy-phenyl-1-oxopropoxymethyl)]1,3-propandiyl ester, 2,2'-thio-diethylbis-[3-(3,5-di-tert.butyl-4-hydroxyphenyl)] prop-ionate, octadecyl-3-(3,5-di-tert.-butyl-4-hydroxyphenyl)propionate, 3,5-bis(1,1-dimethylethyl-2,2-methyl-enebis-(4-methyl-6-tert.-butyl)phenol, tris-(4-tert.-butyl-3-hydroxy-2,6-dimethylbenzyl)-s-triazin-2,4,6-(1H,3H,5H) trione, tris-(3,5-di-tert.butyl-4-hydroxy)-s-triazin-2,4,6-(1H, 3H,5H)-trione or tert.-butyl-3,5-dihydroxybenzene are particularly successfully used.

Based on the weight of the whole reaction mixture, the content of the inhibitors alone or as a mixture is in general 0.01 to 0.50 % (wt/wt), the concentration of the inhibitors preferably being selected such that the color number according to DIN 55945 is not affected. Many of these inhibitors are commercially available.

In the context of the present invention, in addition to the prepolymer produced from compounds of the formula (I), (II) and (III), the mixture further contains at least one radical polymerizable monomer (A) with at least two terminal methacrylate groups.

Di(meth)acrylates coming under this heading are for example polyoxyethylene and polyoxypropylene derivatives of (meth)acrylic acid, such as triethylene glycol (meth)acrylate, tetraethylene glycol(meth)acrylate, tetra-propylene glycol(meth)acrylate, and 1,4-butanediol di(meth)acrylate, diethylene glycol di(meth)acrylate, dipropylene glycol di(meth)acrylate, triethylene glycol di(meth)acrylate, tripropylene glycol di(meth)acrylate, tetraethylene glycol di(meth) acrylate, tetrapropylene glycol di(meth)acrylate, polyethylene glycol di(meth)-acrylate (preferably with weight averaged molecular weights in the range from 200 to 5,000,000 g/mol, advantageously in the range from 200 to 25,000 g/mol, in particular in the range from 200 to 1000 g/mol), polypropylene glycol di(meth)acrylate (preferably with weight averaged molecular weight in the range from 200 to 5,000,000 g/mol, advantageously in the range from 250 to 4000 g/mol, in particular in the range from 250 to 1000 g/mol), 2,2'-thioethanol di(meth)acrylate(thiodiglycol(meth) acrylate), 3,9-di(meth)acryloyloxymethyltricyclo[5.2.1.0 (2.6)]decane, in particular

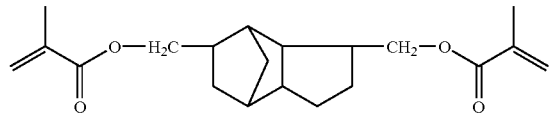

3,8-di(meth)acryloyloxymethyltricyclo[5.2.1.0(2.6)]decane, 4,8-di(meth)acryloyloxymethyltricyclo[5.2.1.0(2.6)]decane, 4,9-di(meth)acryloyloxymethyltricyclo[5.2.1.0(2.6)]decane, ethoxylated bisphenol A di(meth)acrylate, in particular

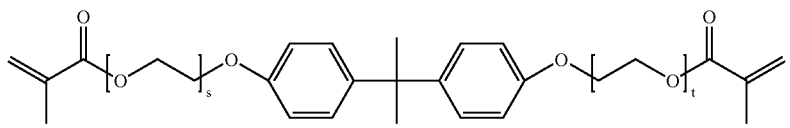

wherein s and t are greater than or equal to zero and the sum s+t preferably lies in the range from 1 to 30, in particular in the range from 2 to 10, and di(meth)acrylates obtainable by reaction of diisocyanates with 2 equivalents of hydroxyalkyl (meth)acrylate, in particular

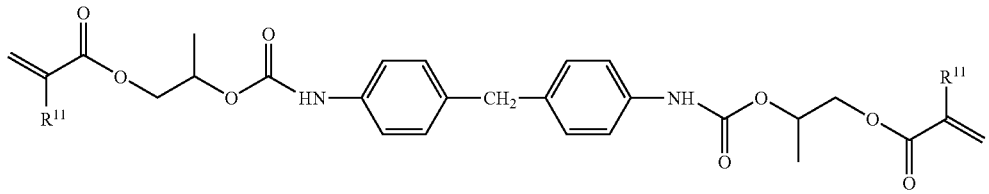

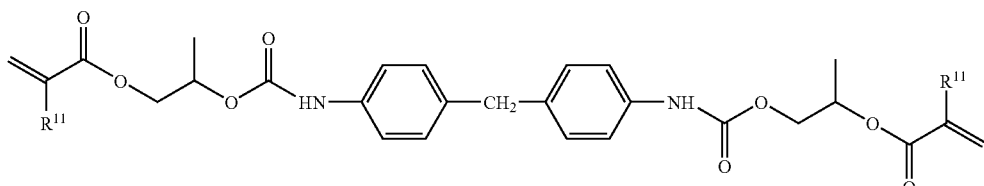

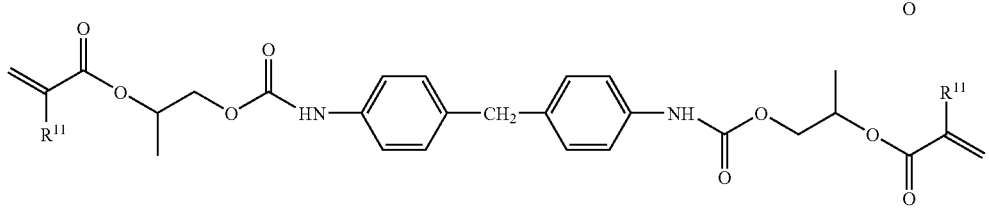

wherein the residue $R^{11}$ each independently of one another means hydrogen or a methyl residue, tri(meth)acrylates, such as trimethylolpropane tri(meth)-acrylate and glycerin tri (meth)acrylate or else (meth)acrylates of ethoxylated or propoxylated glycerin, trimethylolpropane or other alcohols with more than two hydroxy groups.

As monomers (A), di(meth)acrylates of the formula (XI)

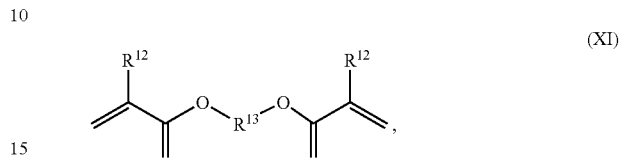

have proved particularly effective. Here $R_{12}$ each independently of one another means hydrogen or methyl. $R^{13}$ designates a linear or branched alkyl or cycloalkyl residue or an aromatic residue with preferably 1 to 100, preferably 1 to 40, preferably 1 to 20, advantageously 1 to 8, in particular 1 to 6 carbon atoms, such as for example a methyl, ethyl, propyl, iso-propyl, n-butyl, iso-butyl, tert-butyl, cyclopentyl, cyclohexyl or phenyl group. Also, in the context of the present invention cycloaliphatic residues also include bi-, tri- and polycyclic aliphatic residues. Linear or branched alkyl or cycloalkyl residues with 1 to 6 carbon atoms are quite particularly preferred as $R^{18}$.

The residue $R^{13}$ is preferably a linear or branched, aliphatic or cycloaliphatic residue, such as for example a methylene, ethylene, propylene, iso-propylene, n-butylene, iso-butylene, tert.-butylene or cyclohexylene group or a residue of the general formula

(XIa)

wherein the residue $R^{15}$ stands for a linear or branched, aliphatic or cycloaliphatic residue or a substituted or unsubstituted aromatic or heteroaromatic residue, such as for example a methylene, ethylene, propylene, iso-propylene, n-butylene, iso-butylene, tert.-butylene or cyclohexylene group, or divalent aromatic or heteroaromatic groups which are derived from benzene, naphthalene, biphenyl, diphenyl ether, diphenylmethane, diphenyl-dimethylmethane, bisphenone, diphenyl sulfone, quinoline, pyridine, anthracene and phenanthrene. Also, in the context of the present invention cycloaliphatic residues also include bi-, tri- and polycyclic aliphatic residues. The residue $R^{14}$ each independently of one another designates a linear or branched, aliphatic or cycloaliphatic residue or a substituted or unsubstituted aromatic or heteroaromatic residue, such as for example a methylene, ethylene, propylene, iso-propylene, n-butylene, iso-butylene, tert.-butylene or cyclohexylene group, or divalent aromatic or heteroaromatic groups which are derived from benzene, naphthalene, biphenyl, diphenyl ether, diphenylmethane, diphenyldimethylmethane, bisphenone, diphenyl sulfone, quinoline, pyridine, anthracene and phenanthrene. Also, in the context of the present invention cycloaliphatic residues also include bi-, tri- and polycyclic aliphatic residues. The residue $X^1$ is each independently of one another oxygen, sulfur, an ester group of the general formulae (XIb) or (XIc)

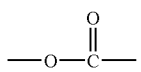
(XIb)

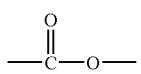
(XIc)

an urethane group of the general formulae (XId), (XIe), (XIf) or (XIg),

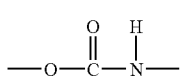
(XId)

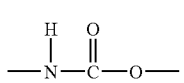
(XIe)

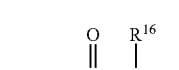
(XIf)

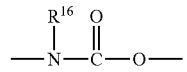
(XIg)

a thiourethane group of the general formula (XIh), (XIi), (XIj) or (XIk),

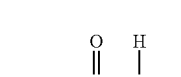
(XIh)

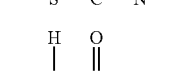
(XIi)

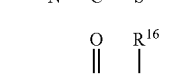
(XIj)

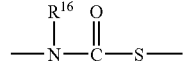
(XVk)

a dithiourethane group of the general formula (XIl), (XIm), (XIn) or (XIo),

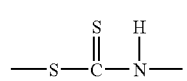
(XII)

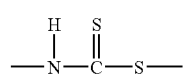
(XIm)

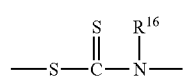
(XIn)

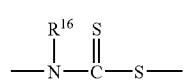
(XIo)

or a thiocarbamate group of the general formula (XIp), (XIq), (XIr) or (XIs),

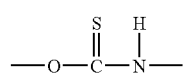
(XIp)

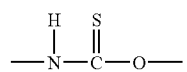
(XIq)

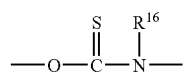
(XIr)

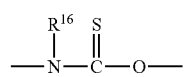
(XIs)

preferably oxygen, wherein the residue $R^{16}$ stands for a linear or branched, aliphatic or cycloaliphatic residue or a substituted or unsubstituted aromatic or heteroaromatic residue, such as for example a methyl, ethyl, propyl, iso-propyl, n-butyl, iso-butyl, tert.-butyl or cyclohexyl group, or monovalent aromatic or heteroaromatic groups which are derived from benzene, naphthalene, biphenyl, diphenyl ether, diphenylmethane, diphenyldimethylmethane, bisphenone, diphenyl sulfone, quinoline, pyridine, anthracene and phenanthrene. Also, in the context of the present invention cycloaliphatic residues also include bi-, tri- and polycyclic aliphatic residues. z is a whole number between 1 and 1000, advantageously between 1 and 100, in particular between 1 and 25.

Particularly preferred di(meth)acrylates of the formula (XI) include ethylene glycol di(meth)acrylate, ethoxylated bisphenol A di(meth)acrylate, in particular

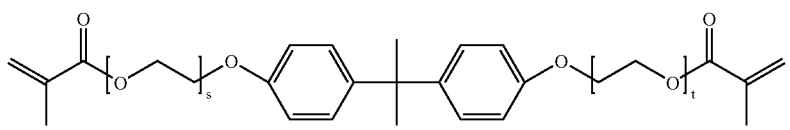

wherein s and t are greater than zero and the sum s+t preferably lies in the range from 1 to 20, in particular in the range from 2 to 10, and di(meth)acrylates obtainable by reaction of diisocyanates with two equivalents of hydroxyalkyl(meth)acrylate, in particular

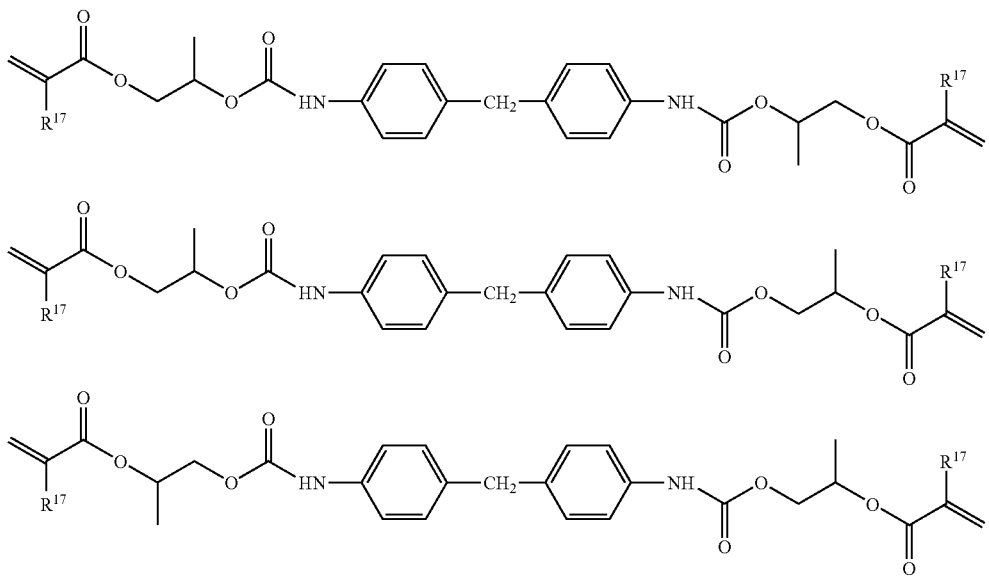

wherein the residue $R^{17}$ each independently of one another means hydrogen or a methyl residue, 3,8-di(meth)acryloyloxymethyltricyclo[5.2.1.0(2.6)]decane, 3,9-di(meth)acryloyloxymethyltricyclo[5.2.1.0(2.6)]decane, 4,8-di(meth)acryloyloxymethyltricyclo[5.2.1.0(2.6)]decane, 4,9-di(meth)acryloyloxymethyltricyclo[5.2.1.0(2.6)]decane, thioglycol di(meth)acrylate, polypropylene glycol di(meth)acrylate, preferably with a weight averaged molecular weight in the range from 200 to 1000 g/mol and/or poly-ethylene glycol di(meth)acrylate, preferably with a weight averaged molecular weight in the range from 200 to 1000 g/mol. Here the dimethacrylates of the said compounds are particularly preferable. Quite particularly advantageous results are achieved with the use of polyethylene glycol di(meth)acrylate, preferably with a weight averaged molecular weight in the range from 200 to 1000 g/mol.

The content of monomer (A) is 2-50 wt. %, in particular 10-30 wt. %, based on all monomers used in the mixture.

In the context of the present invention, in addition to the prepolymer, consisting of the compounds of the formula (I), (II) and (III) and at least one radical polymerizable monomer (A), the mixture also contains an aromatic vinyl compound.

Among the aromatic vinyl compounds, styrenes, substituted styrenes with an alkyl substituent in the side-chain, such as for example α-methylstyrene and α-ethylstyrene, substituted styrenes with an alkyl substituent on the ring, such as vinyltoluene and p-methylstyrene, halogenated styrenes, such as for example monochlorostyrene, dichloro-styrene, tribromostyrene and tetrabromostyrene and dienes, such as for example 1,2-divinylbenzene, 1,3-divinylbenzene, 1,4-divinylbenzene, 1,2-diisopropenyl-benzene, 1,3-diisopropenylbenzene and 1,4-diisopropenyl-benzene, are preferably used.

The content of the aromatic vinyl compounds is 5 to 40 wt. %, preferably 10 to 30 wt. %, particularly preferably 15 to 25 wt. %, based on the total quantity of the compounds of the formula (I), (II) and (III) which are used in the prepolymer, the radical polymerizable monomer (A) and the aromatic vinyl compounds and other optionally used monomers.

Surprisingly, the addition of monomer (A) and the aromatic vinyl compound improves the mechanical properties of the plastic material according to the invention without adversely affecting its optical properties. In many cases, a favorable effect on the optical properties can be noted.

According to a particular aspect of the present invention, compounds preferably linearly structured molecules of different chain length (asymmetric cross-linkers) of the general formula (XII) can be contained

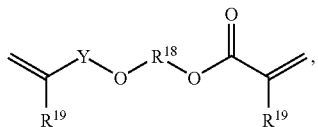

(XII)

wherein the residue $R^{19}$ independently means a hydrogen atom, a fluorine atom and/or a methyl group, the residue $R^{18}$ means a linking group, which preferably includes 1 to 1000, in particular 2 to 100 carbon atoms, and the residue Y means a bond or a linking group with 0 to 1000 carbon atoms, in particular 1 to 1000 carbon atoms, and preferably 1 to 100 carbon atoms. The length of the molecule can be varied via the molecule part $R^{18}$. Compounds of the formula (XII) have a terminal (meth)acrylate function at one end of the molecule, and a terminal group different from a methacrylate function at the other. The preferred groups Y include in particular a bond (vinyl group) a $CH_2$ group (allyl group) and aliphatic or aromatic groups with 1 to 20 carbon atoms, such as for example a group derived from benzene, wherein particularly preferably the aliphatic or aromatic groups contain a urethane group.

The residue $R^{18}$ is preferably a linear or branched, aliphatic or cycloaliphatic residue, such as for example a methylene, ethylene, propylene, iso-propylene, n-butylene, iso-butylene, tert.-butylene or cyclohexylene group or a residue of the general formula

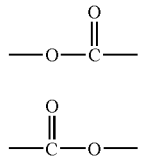

(XIIa)

wherein the residue $R^{21}$ stands for a linear or branched, aliphatic or cycloaliphatic residue or a substituted or unsubstituted aromatic or heteroaromatic residue, such as for example a methylene, ethylene, propylene, iso-propylene, n-butylene, iso-butylene, tert.-butylene or cyclohexylene group, or divalent aromatic or heteroaromatic groups which are derived from benzene, naphthalene, biphenyl, diphenyl ether, diphenylmethane, diphenyl-dimethylmethane, bisphenone, diphenyl sulfone, quinoline, pyridine, anthracene and phenanthrene. Also, in the context of the present invention cycloaliphatic residues also include bi-, tri- and polycyclic aliphatic residues. The residue $R^{20}$ each independently of one another designates a linear or branched, aliphatic or cycloaliphatic residue or a substituted or unsubstituted aromatic or heteroaromatic residue, such as for example a methylene, ethylene, propylene, iso-propylene, n-butylene, iso-butylene, tert.-butylene or cyclohexylene group, or divalent aromatic or heteroaromatic groups which are derived from benzene, naphthalene, biphenyl, diphenyl ether, diphenylmethane, diphenyldimethylmethane, bisphenone, diphenyl sulfone, quinoline, pyridine, anthracene and phenanthrene. Also, in the context of the present invention cycloaliphatic residues also include bi-, tri- and polycyclic aliphatic residues. The residue $X^1$ each independently of one another is oxygen, sulfur, an ester group of the general formula (XIIb) or (XIIc)

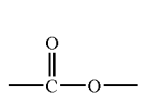

(XIIb)

(XIIc)

an urethane group of the general formulae (XIId), (XIIe), (XIIf) or (XIIg),

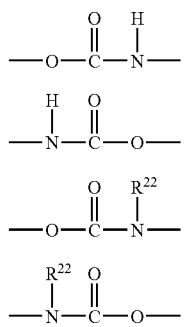

(XIId)

(XIIe)

(XIIf)

(XIIg)

a thiourethane group of the general formula (XIIh), (XIIi), (XIIj) or (XIIk),

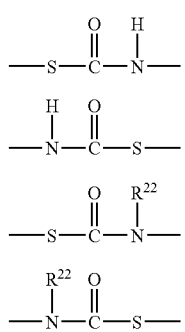

(XIIh)

(XIIi)

(XIIj)

(XIIk)

a dithiourethane group of the general formula (XIII), (XIIm), (XIIn) or (XIIo),

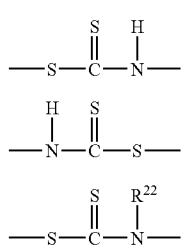

(XIII)

(XIIm)

(XIIn)

-continued

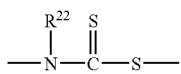
(XIIo)

or a thiocarbamate group of the general formula (XIIp), (XIIq), (XIIr) or (XIIs),

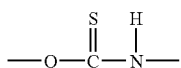
(XIIp)

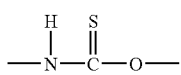
(XIIq)

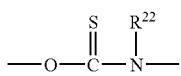
(XIIr)

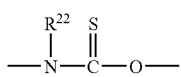
(XIIs)

preferably oxygen, wherein the residue $R^{22}$ stands for a linear or branched, aliphatic or cycloaliphatic residue or a substituted or unsubstituted aromatic or heteroaromatic residue, such as for example a methyl, ethyl, propyl, iso-propyl, n-butyl, iso-butyl, tert.-butyl or cyclohexyl group, or monovalent aromatic or heteroaromatic groups which are derived from benzene, naphthalene, biphenyl, diphenyl ether, diphenylmethane, diphenyldimethylmethane, bisphenone, diphenyl sulfone, quinoline, pyridine, anthracene and phenanthrene. Also, in the context of the present invention cycloaliphatic residues also include bi-, tri- and polycyclic aliphatic residues. z is a whole number between 1 and 1000, advantageously between 1 and 100, in particular between 1 and 25.

A particular embodiment of the formula (XII) concerns compounds of the formula (XIII)

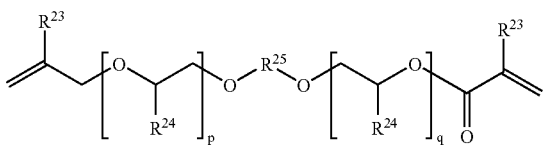
(XIII)

and/or of the formula (XIV)

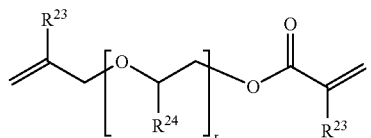
(XIV)

wherein the residues $R^{23}$ and $R^{24}$ each independently of one another stand for hydrogen or a methyl residue, and the residue $R^{25}$ designates a linear or branched, aliphatic or cycloaliphatic divalent residue or a substituted or unsubstituted aromatic or heteroaromatic divalent residue. Preferred residues have been presented above.

The length of the chain can be influenced by variation of the number of polyalkylene oxide units, preferably polyethylene glycol units. Compounds of the formulae (XIII) and (XIV), which for r, p and q independently of one another have 1-40, preferably 5-20, in particular 7 to 15 and quite particularly preferably 8-12 polyalkylene oxide units, have been found particularly suitable for the solution of the problem described here.

Asymmetric crosslinkers quite particularly preferred according to the invention include compounds of the formula (XIV), in particular

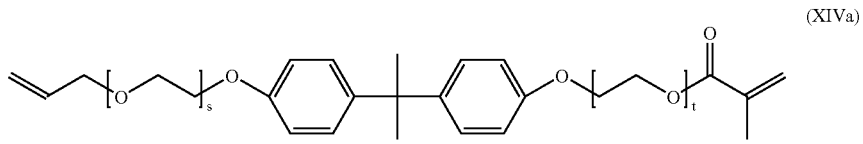
(XIVa)

wherein s and t are greater than or equal to zero and the sum s+t preferably lies in the range from 1 to 20, in particular in the range from 2 to 10, and compounds of the formula (XIII), in particular

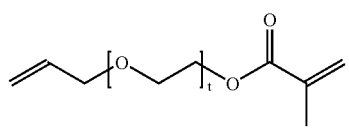
(XIVb)

wherein t is greater than or equal to zero and t preferably lies in the range from 1 to 20, in particular in the range from 2 to 10.

According to a particular aspect, the mixture preferably contains 0.5-40 wt. %, in particular 5 to 15 wt. % of compounds of the formula (XII) and/or (XIII), based on the total weight of the monomer mixture.

In the context of a particularly preferred embodiment of the present invention, the mixture according to the invention additionally contains at least one ethylenically unsaturated monomer (B). These monomers (B) differ from the asymmetric compounds of the formulae (XIII) and (XIV), the monomers (A) and the thio(meth)acrylates of the formulae (I) and/or (II). The monomers (B) are known in the specialist field and are preferably copolymerizable with the monomers (A) and the thio(meth)acrylates of the formulae (I) and/or (II).

These monomers (B) include in particular:

Nitriles of (meth)acrylic acid and other nitrogen-containing methacrylates, such as methacryloylamido-acetonitrile, 2-methacryloyloxyethylmethylcyanamide and cyanomethyl methacrylate;

(Meth)acrylates which are derived from saturated alcohols, such as methyl(meth)acrylate, ethyl(meth)acrylate, n-propyl(meth)acrylate, iso-propyl(meth)acrylate, n-butyl(meth)acrylate, sec-butyl(meth)acrylate, tert.-butyl(meth)acrylate, pentyl(meth)acrylate, hexyl(meth)-acrylate, heptyl(meth)acrylate, 2-ethylhexyl(meth)-acrylate, octyl(meth)acrylate, nonyl(meth)acrylate, iso-octyl(meth)acrylate, iso-nonyl(meth)acrylate, 2-tert.-butylheptyl(meth)acrylate, 3-iso-propylheptyl(meth)-acrylate, decyl(meth)acrylate, undecyl meth)acrylate, 5-methylundecyl(meth)acrylate, dodecyl(meth)acrylate, 2-methyldodecyl(meth)acrylate, tridecyl(meth)acrylate, 5-methyltridecyl(meth)acrylate, tetradecyl(meth)acrylate, pentadecyl(meth)acrylate, hexadecyl(meth)acrylate, 2-methylhexadecyl(meth)acrylate, heptadecyl(meth)-acrylate, 5-iso-propylheptadecyl(meth)acrylate, 4-tert.-butyloctadecyl(meth)acrylate, 5-ethyloctadecyl(meth)-acrylate, 3-isopropyloctadecyl(meth)acrylate, octadecyl(meth)acrylate, nonadecyl(meth)acrylate, eicosyl(meth)-acrylate, cetyleicosyl(meth)acrylate, stearyleicosyl(meth)acrylate, docosyl(meth)acrylate and/or eicosyltetratriacontyl(meth)acrylate;

Cycloalkyl methacrylates, such as cyclopentyl(meth)-acrylate, cyclohexyl(meth)acrylate, 3-vinyl-2-butyl-cyclohexyl(meth)acrylate and bornyl(meth)acrylate;

(Meth)acrylates which are derived from unsaturated alcohols, such as 2-propynyl(meth)acrylate, allyl(meth)-acrylate and oleyl(meth)acrylate and vinyl(meth)acrylate;

Aryl(meth)acrylates, such as benzyl(meth)acrylate or phenyl(meth)acrylate, wherein the aryl residues can in each case be unsubstituted or up to four times substituted;

Hydroxyalkyl(meth)acrylate, such as 3-hydroxypropyl(meth)acrylate, 3,4-dihydroxybutyl(meth)acrylate, 2-hydroxyethyl(meth)acrylate, 2-hydroxypropyl(meth)-acrylate, 2,5-dimethyl-1,6-hexanediol(meth)acrylate, 1,10-decanediol(meth)acrylate and 1,2-propanediol(meth)-acrylate;

Aminoalkyl(meth)acrylate, such as tris(2-methacryloxyethyl)amine, N-methylformamidoethyl(meth)acrylate and 2-ureidoethyl(meth)acrylate;

Carbonyl-containing (meth)acrylate, such as 2-carboxyethyl(meth)acrylate, carboxymethyl(meth)acrylate, oxazolidinyl-ethyl(meth)acrylate, N-(methacryloyloxy)formamide, acetonyl (meth)acrylate, N-methacryloylmorpholine and N-methacryloyl-2-pyrrolidinone;

(Meth)acrylates of ether alcohols such as tetrahydro-furfuryl(meth)acrylate, vinyloxyethoxyethyl(meth)-acrylate, methoxyethoxyethyl(meth)acrylate, 1-butoxy-propyl(meth)acrylate, 1-methyl-(2-vinyloxy)ethyl(meth)-acrylate, cyclohexyloxymethyl(meth)acrylate, methoxy-methoxyethyl(meth)acrylate, benzyloxymethyl(meth)-acrylate, furfuryl(meth)acrylate, 2-butoxyethyl(meth)-acrylate, 2-ethoxyethoxymethyl(meth)acrylate, 2-ethoxy-ethyl(meth)acrylate, allyloxymethyl(meth)acrylate, 1-ethoxybutyl(meth)acrylate, methoxymethyl(meth)acrylate, 1-ethoxyethyl(meth)acrylate and ethoxymethyl(meth)-acrylate;

(Meth)acrylates of halogenated alcohols, such as 2,3-dibromopropyl(meth)acrylate, 4-bromophenyl(meth)acrylate, 1,3-dichloro-2-propyl(meth)acrylate, 2-bromoethyl(meth)-acrylate, 2-iodoethyl(meth)acrylate and chloromethyl(meth)acrylate;

Oxiranyl(meth)acrylates, such as 2,3-epoxybutyl(meth)acrylate, 3,4-epoxybutyl(meth)acrylate and glycidyl(meth)acrylate;

Amides of (meth)acrylic acid, such as N-(3-dimethylaminopropyl)(meth)acrylamide, N-(diethylphosphono)(meth)acrylamide, 1-(meth)acryloylamido-2-methyl-2-propanol, N-(3-dibutylaminopropyl)(meth)acrylamide, N-t-butyl-N-(diethylphosphono)(meth)acrylamide, N,N-bis(2-diethylaminoethyl)(meth)acrylamide, 4-(methyl)acryloylamido-4-methyl-2-pentanol, N-(methoxymethyl)(meth)acrylamide, N-(2-hydroxyethyl)(meth)acrylamide, N-(acetyl)(meth)acrylamide, N-(dimethylaminoethyl)(meth)acrylamide, N-methyl-N-phenyl(meth)acrylamide, N,N-diethyl(meth)acrylamide, N-methyl(meth)acrylamide, N,N-dimethyl(meth)acrylamide and N-isopropyl(meth)acrylamide;

Heterocyclic (meth)acrylates, such as 2-(1-imidazolyl)-ethyl(meth)acrylate, 2-(4-morpholinyl)ethyl(meth)acrylate and 1-(2-methacryloyloxyethyl)-2-pyrrolidone;

Phosphorus, boron and/or silicon-containing (meth)acrylates such as 2-(dimethylphosphonato)propyl(meth)acrylate, 2-(ethylenphosphito)propyl(meth)acrylate, dimethylphosphinomethyl(meth)acrylate, dimethylphosphonoethyl(meth)acrylate, diethyl(meth)acryloyl phosphonate and dipropyl (methacryloyl)phosphate;

Sulfur-containing (meth)acrylates such as ethylsulfinylethyl(meth)acrylate, 4-thiocyanatobutyl(meth)acrylate, ethylsulfonylethyl(meth)acrylate, thiocyanatomethyl(meth)acrylate, methylsulfinylmethyl(meth)acrylate and bis((meth)acryloyloxyethyl)sulfide;

Bis(allyl carbonates) such as ethylene glycol bis(allyl carbonate), 1,4-butanediol bis(allyl carbonate) and diethylene glycol bis(allyl carbonate);

Vinyl halides, such as for example vinyl chloride, vinyl fluoride, vinylidene chloride and vinylidene fluoride;

Vinyl esters such as vinyl acetate;

Heterocyclic vinyl compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinyl-imidazole, N-vinylpyrrolidone, 2-vinylpyrrolidone, N-vinyl-pyrrolidine, 3-vinylpyrrolidine, N-vinylcaprolactam, N-vinylbutyrolactam, vinyloxolan, vinylfuran, vinylthiophen, vinylthiolan, vinylthiazoles and hydrogenated vinylthiazoles, vinyloxazoles and hydrogenated vinyloxazoles;

Vinyl and isoprenyl ethers;

Maleic acid and maleic acid derivatives, such as for example mono- and diesters of maleic acid, wherein the alcohol residues have 1 to 9 carbon atoms;

Maleic anhydride, methylmaleic anhydride, maleimide and methylmaleimide;

Fumaric acid and fumaric acid derivatives, such as for example mono- and diesters of fumaric acid, wherein the alcohol residues have 1 to 9 carbon atoms.

In addition, a di(meth)acrylate listed under monomer (A) can also be used as monomer (B).

In this connection, the expression (meth)acrylates includes methacrylates and acrylates and mixtures thereof. Likewise, the expression (meth)acrylic acid includes methacrylic acid and acrylic acid and mixtures thereof.

The ethylenically unsaturated monomers can be used singly or as mixtures.

The composition of the monomer mixtures according to the invention is in principle any desired. It can be used so as to adapt the property profile of the plastic according to the invention to the requirements of the use. It has however been found extremely advantageous to select the composition of the monomer mixture such that the prepolymer consisting of the compound(s) of the formula (I), (II) and (III) and at least one monomer (A) and styrene mix homogeneously at the desired polymerization temperature, since such mixtures, on account inter alia of their low viscosity, are easily manageable and moreover can be polymerized to homogeneous plastics with improved material properties.

According to a particularly preferred embodiment of the present invention, the monomer mixture contains a prepolymer consisting of at least 5.0 wt. %, preferably at least 20.0 wt. %, particularly preferably at least 50.0 wt. % of compounds of the formula (I), (II) and (III), each based on the total weight of the monomer mixture. The content by weight of the monomer (A) is preferably at least 2.0 wt. %, preferably at least 10.0 wt. %, particularly preferably at least 20.0 wt. %, each based on the total weight of the monomer mixture. The content by weight of aromatic vinyl compounds, in particular styrene, is preferably at least 2.0 wt. %, preferably at least 10.0 wt. %, particularly preferably at least 20.0 wt. %, each based on the total weight of the monomer mixture.

According to a particular aspect of the present invention, the mixture contains 50 to 90 wt. %, in particular 60 to 85 wt. % of the prepolymer of the monomers of the formulae (I) and/or (II) and (III), 2 to 50 wt. %, in particular 10 to 30 wt. % of monomers (A) and 2 to 50 wt. %, in particular 10 to 30 wt. % of vinyl compounds, in particular styrene and 0 to 45 wt. %, in particular 1 to 10 wt. % of monomers of the formulae (XII) and (XIII) and/or monomers (B), each based on the total weight of the monomer mixture.

The production of the monomer mixture to be used according to the invention is well known to the skilled person. It can for example be effected by mixing of the prepolymer, consisting of thio(meth)acrylates of the formulae (I) and/or (II) with (III), the aromatic vinyl compounds and the monomers (A) and (B) in a manner known per se.

For the purposes of the present invention, the monomer mixture is preferably free-flowing at normal pressure and temperatures in the range from 20.0° C. to 80.0° C. The term "free-flowing" is well known to the skilled person. It designates a liquid which preferably can be poured into various molds and stirred and homogenized with the aid of suitable additives. Particular, free-flowing compounds in the sense of the invention have in particular dynamic viscosities of the order of 0.1 mPa·sec to 10 Pa·sec, advantageously in the range from 0.65 mPa·sec to 1 Pa·sec at 25° C. and at normal pressure (101325 Pa). In a quite particularly preferred embodiment of the present invention, a poured monomer mixture contains no bubbles, in particular no air bubbles. Also preferred are those monomer mixtures out of which bubbles, in particular air bubbles, can be removed by suitable processes, such as for example increasing the temperature and/or application of a vacuum.

The highly transparent plastic according to the invention is obtainable by free radical copolymerization of the low viscosity ($\eta$<200 mpa·sec) monomer mixture described above. Free radical copolymerization is a widely known process initiated by free radicals, wherein a mixture of low molecular weight monomers is converted into high molecular weight compounds, so-called polymers. For further details, reference is made to the disclosure by H G Elias, Macromolecules, Vols. 1 and 2, Basel, Heidelberg, New York Hüthig and Wepf. 1990 and Ullmann's Encyclopedia of Industrial Chemistry, 5$^{th}$ Edn., Keyword "Polymerization Processes".

In a preferred embodiment of the present invention, the plastic according to the invention is obtainable by bulk or solventless polymerization of the monomer mixture. Here, bulk or solventless polymerization is understood to mean a polymerization process wherein monomers are polymerized without a solvent, so that the polymerization reaction takes place in bulk or solventless. Polymerization in emulsion (so-called emulsion polymerization) and polymeriz-ation in dispersion (so-called suspension polymerization), wherein the organic monomers are suspended in an aqueous phase with protective colloids and/or stabilizers and more or less coarse polymerizate particles are formed, are to be regarded as the antithesis of this. A particular form of polymerization in heterogeneous phase is bead polymerization, which can essentially be considered as a type of suspension polymerization.

The polymerization reaction can basically be triggered in any way familiar to the skilled person, for example initiated with the use of a radical initiator (e.g. peroxide, azo compound) or by irradiation with UV radiation, visible light or $\alpha$ rays, $\beta$ rays or $\gamma$ rays, or by a combination thereof.

In a preferred embodiment of the present invention, lipophilic radical polymerization initiators are used for the initiation of the polymerization. The radical polymer-ization initiators are lipophilic in particular so that they dissolve in the solventless polymerization mixture. Usable compounds, apart from the classical azo initiators such as azoisobutyronitrile (AIBN) or 1,1-azobiscyclohexan-carbonitrile, include inter alia peroxy compounds such as for example tert.-amyl peroxyneodecanoate, tert.-amyl peroxypivalate, tert.-butyl peroxypivalate, tert.-amyl peroxy-2-ethylhexanoate, tert.-butyl peroxy-2-ethyl-hexanoate, tert.-amyl peroxy-3, 5, 5-trimethylhexanoate, ethyl 3,3-di-(tert.-amylperoxy)-butyrate, tert.-butyl perbenzoate, tert.-butyl hydroperoxide, decanoyl peroxide, lauryl peroxide, benzoyl peroxide and any mixtures of the said compounds. Among the aforesaid compounds, AIBN is quite particularly preferred.

In a further preferred embodiment of the present invention, initiation of the polymerization is effected with the use of known photoinitiators by irradiation with UV radiation or the like. Here the common, commercially available compounds such as for example benzophenone, $\alpha,\alpha$-diethoxy-acetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacylphosphine oxide and others are used, and the said photoinitiators can be used alone or in combination of two or several or in combination with one of the above polymerization initiators.

The quantity of the radical-forming agents can vary over wide ranges. Preferably for example quantities in the range from 0.1 to 5.0 wt. %, based on the weight of the whole composition, are used. Particularly preferably, quantities in the range from 0.1 to 2.0 wt. %, in particular quantities in the range from 0.1 to 0.5 wt. %, each based on the weight of the whole composition, are used.

The polymerization temperature to be selected for the polymerization is obvious to the skilled person. It is first and foremost determined by the initiator selected and the nature and manner of initiation (thermal, by irradiation, etc.). It is known that the polymerization temperature can affect the product properties of a polymer. Hence in the context of the present invention polymerization temperatures in the range from 20.0° C. to 100.0° C., advantageously in the range from 20.0° C. to 80.0° C., in particular in the range from 20.0° C. to 60.0° C. are preferred. In a particularly preferred embodiment of the present invention, the reaction temperature during the reaction is increased, preferably stepwise. Further, tempering at elevated temperature, for example at 100° C. to 150° C. towards the end of the reaction has been found advantageous.

The reaction can take place both under decreased pressure and under increased pressure. Preferably however, it is carried out under normal pressure. The reaction can take place in air or in a protective gas atmosphere, when as small as possible an oxygen content is preferably present, since this inhibits a possible polymerization.

In a particularly preferred embodiment of the present invention, the production of the highly transparent plastic according to the invention is effected in such a manner that a homogeneous mixture of the components monomer mixture, initiator and other additives, such as for example lubricants, is produced and this is immediately filled between glass plates, whose shape is predetermined by the later use, e.g. as lenses, spectacle lenses, prisms or other optical components. The solventless polymerization is initiated by energy input, for example by energy-rich irradiation, in particular with UV light or by heating, advantageously in the water-bath and over several hours. In this way, the optical material is obtained in its desired shape as a clear, transparent, colorless, hard plastic.

In the context of the present invention, lubricants mean additives for filled plastic materials, such as compression molding materials and injection molding materials, in order to make the fillers slide more easily and hence make the compression molding materials more easily deformable. For this, for example metal soaps and siloxane combinations are suitable. Owing to its insolubility in plastics, part of the lubricant migrates to the surface during processing and acts as a parting agent. Particularly suitable lubricants, such as nonionic fluoro surfactants, nonionic silicone surfactants, quaternary ammonium salts and acid phosphate esters, are described in EP 271839 A, to the disclosures wherein reference is explicitly made in the context of the present invention.

According to the invention, a highly transparent plastic with very good optical and mechanical properties is made available. Thus it has preferably a transparency according to DIN 5036 greater than 88.0%, advantageously greater than 89.0%.

The refractive index $n_D$ of the plastic according to the invention is preferably greater than or equal to 1.59. In general, the refractive index of a medium is dependent on the wavelength of the incident radiation and on the temperature. The information according to the invention on the refractive index therefore relates to the standard information specified in DIN 53491 (standard wavelength of the (yellow) D-line of sodium (ca. 589 nm)).

According to the invention, the plastic preferably has an Abbé number >36.0 according to DIN 53491. The skilled person can obtain information on the Abbé number from the literature, for example the Lexicon of Physics (Walter Greulich (publ.); Lexikon der Physik, Heidelberg; Spektrum, Akademischer Verlag, Vol. 1; 1998).

According to a particularly preferred embodiment of the present invention, the plastic has an Abbé number >36.0, advantageously >37.0, in particular >38.0.

The mechanical properties are tested by the FDA falling ball test (ANSI Z 80.1). The test is passed when the test specimen withstands the impact of a ball of 16 mm diameter undamaged: the greater the diameter of the ball with which the sample is impacted and remains undamaged, the better the material properties.

Furthermore, the plastic according to the invention is advantageously characterized by a high glass transition temperature, so that at temperatures above room temperature it also retains its outstanding mechanical properties, in particular its impact resistance and its hardness. The glass transition temperature of the plastic according to the invention is preferably greater than 80° C., advantageously greater than 90° C., in particular greater than 95° C.

Possible fields of use for the highly transparent plastic according to the invention are obvious to the skilled person. It is particularly suitable for all uses which are indicated for transparent plastics. On account of its characteristic properties, it is above all suitable for optical lenses, in particular for ophthalmic lenses.

A further object of the present invention is a mixture containing (a) a mixture according to claim 1 and (b) at least one photochromic dye. For this, all photochromic dyes known to the skilled person and mixtures thereof can be used. Preferably, photochromic dyes such as for example spiro(indoline) naphthoxazines, spiro(indoline)benzoxazines, spiropyrans, acetanilides, aldehyde hydrazones, thioindigo, stilbene derivatives, rhodamine derivatives and anthra-quinone derivatives, benzofuroxans, benzopyrans, naphtho-pyrans, organometallic dithiozonates, fulgides and fulgimides are used.

From these mixtures, photochromic materials can be produced which are used for example as lenses, preferably optical lenses, glass panes or glass inserts.

The following examples and the comparison example serve for illustration of the invention, without it being intended that any restriction should result from this.

EXAMPLES

Synthesis of the Thiomethacrylate Mixture 75.36 g of 1,2-ethanedithiol are weighed into a conical flask with a blanket gas inlet and stirred, and 416.43 g of 13% NaOH solution are fed in within 30 minutes at 25-30° C. with water cooling. A brownish, clear solution is formed.

178.64 g of methacrylic anhydride and the Na thiolate solution are now fed in parallel within 45 minutes at the desired input temperature into the previously prepared and stirred acetic acid/water in the reaction flask. In general, the flask contents cool by ca. 2° C. at the start of the addition, and after ca. 5-10 minutes a slightly exothermic reaction begins, i.e. the mixture is now cooled appropriately, in order to maintain the desired reaction temperature (35° C.). After the end of the addition, the mixture is stirred for a further 5 minutes at 35° C. and then cooled to ca. 25° C. with stirring.

The mixture is transferred to a separating funnel, separated and the lower, aqueous phase drained off. For the workup, the organic phase is transferred to a conical flask and stirred for ca. 15 minutes with ®Dowex M-31, and then the ion exchanger is filtered off.

The somewhat cloudy to almost clear crude ester solution is now stabilized with 100 ppm of HQME and concentrated on the rotary evaporator at max. 50° C. The colorless final product is filtered at room temperature (20-25° C.). Ca. 140 g of colorless, clear ester are obtained.

Production of Prepolymer: Reaction of 6.84 g of the thiodi-(meth)acrylate and 0.36 g of DMDO in the presence of an amine as catalyst analogously to EP 284374

For the production of a polymer based on an oligomeric thiodimethacrylate, for example 7.2 g of the prepolymer, 2.4 g of styrene, 2.4 g of 10-times ethoxylated bisphenol A di(meth)acrylate, 0.1 g of hydroxyethyl methacrylate, 36 mg of a UV initiator such as for example Irgacur 819 and 24 mg of tert.-butyl perocotoate or similar initiators (see Example 1)

are mixed. The homogeneous casting resin mixture is fed into a suitable mould and cured within 10 minutes in a UV curing unit with 1200 W mercury high pressure lamps. It is then tempered for a further 2 hrs at ca. 120° C. in the oven.

| Expt. | System | Refract./Abbé No. DIN 53491 589 nm | | Odor | Transmission | FDA falling ball test diameter ANSI Z80.1 | Mean ball diameter in mn test passed |
|---|---|---|---|---|---|---|---|
| Examples | | | | | | | |
| B 1 | PLEX 6931/DMDO prepolymer co styrene co E10BADMA = 60:20:20 plus 1% HEMA | 1.5939 | 38.2 | no | 89 | passed | 18 |
| Comparison Examples | | | | | | | |
| VB I | PLEX 6931 co DMDO co styrene co E10BADMA = 57:3:20:20 plus 1% HEMA (#) | — | — | yes | — | — | — |
| VB II | PLEX 6931 co styrene co E10BADMA = 60:20:20 plus 1% HEMA | 1.5959 | 34.9 | no | 89 | passed | 16 |
| VB III | PLEX 6931/DMDO prepolymer co styrene = 70:30 plus 1% HEMA | 1.6089 | 29.6 | no | 89 | passed | 16 |

Plex 6931 O: reaction product from methacrylic anhydride and ethanedithiol from DE 316671
E10BADMA: ethoxylated bisphenol A dimethacrylate with ethoxylation level of ca. 10
DMDO: dimercaptodioxaoctane
HEMA: hydroxyethyl methacrylate
(#): because of the odor problem, no further analytical tests were made.

The mixture according to the invention (B 1) is odorless. The comparison example VB I did not pass this test, hence it was not further investigated.

However, at comparable refractive index (of B1 with VB II and VB III) the Abbé number was better with the mixture according to the invention. In addition, the mixture according to the invention came out considerably better in the falling ball test.

The invention claimed is:

1. A mixture for the production of transparent plastics, comprising:
a) a prepolymer, produced from compounds of the formula (I) and (II)

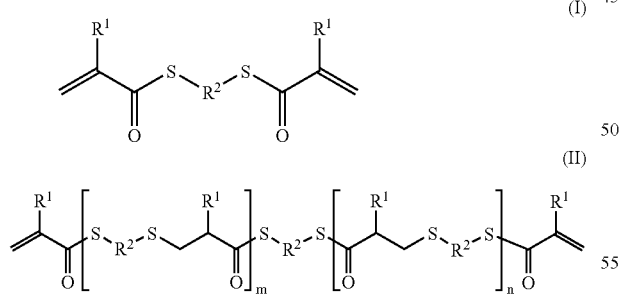

wherein $R^1$ each independently of one another mean hydrogen or a methyl residue,
$R^2$ each independently of one another mean a linear or branched, aliphatic or cycloaliphatic residue or a substituted or unsubstituted aromatic or heteroaromatic residue and m and n each independently of one another mean a whole number greater than 0 with m+n>0, and alkylthiols or polythiols,

HS—R³—SH (III)

wherein $R^3$ can similarly or differently from $R^2$ have the meaning stated in $R^2$, and
b) at least one radical polymerizable monomer (A) with at least two methyl acrylate groups; and
c) aromatic vinyl compounds,
d) optionally, a radical polymerizable monomer with at least two terminal olefinic groups, which differ in reactivity,
e) optionally, at least one ethylenically unsaturated monomer (B);
f) or optionally, a mixture of d) and e); and
g) an asymmetric crosslinker which is a radical polymerizable monomer with at least two terminal olefinic groups which differ in reactivity, which is
(i) a compound of the formula (XIVa)

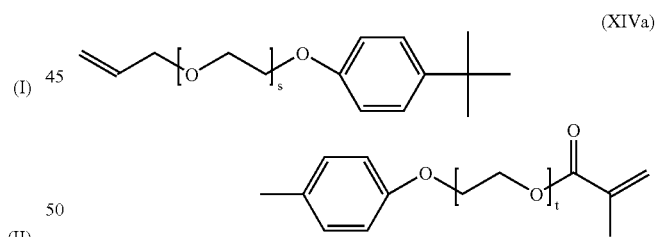

wherein s and t are greater than or equal to zero and the sum s+t is in the range from 1 to 20; or
(ii) a mixture of a compound of formula (XIII) and the compound of the formula (XIVa)

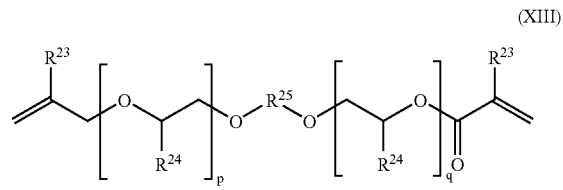

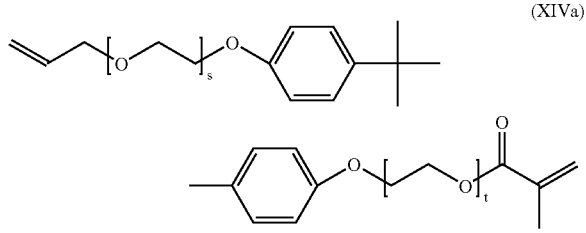 (XIVa)

wherein, in formula (XIII), the residues $R^{23}$ and $R^{24}$ each independently of each other are a hydrogen or a methyl residue, and the residue $R^{25}$ designates a linear or branched, aliphatic or cycloaliphatic divalent residue or a substituted or unsubstituted aromatic or heteroaromatic divalent residue, and wherein, in formula (XIVa) s and t are greater than or equal to zero and the sum s+t is in the range from 1 to 20.

2. The mixture as claimed in claim 1, which comprises more than 10 mol. % of compounds of the formula (II) with m+n=2, based on the total quantity of the compounds of the formula (I), (II) and (III).

3. The mixture as claimed in claim 1, wherein the residue $R^2$ of the formulae (I) and/or (II) is an aliphatic residue with 1 to 10 carbon atoms.

4. The mixture as claimed in claim 1, which comprises more than 5.8 mol. % of compounds of the formula (II) with m+n=3, based on the total quantity of the compounds of the formula (I), (II) and (III).

5. The mixture as claimed in claim 1, which comprises 1 to 50 mol. % of compounds of the formula (I), based on the total quantity of the compounds of the formula (I), (II) and (III).

6. The mixture as claimed in claim 1, which comprises 1 to 40 mol. % of compounds of the formula (II) with m+n=1, based on the total quantity of the compounds of the formula (I), (II) and (III).

7. The mixture as claimed in claim 1, which comprises compounds of the formula (II) with m+n>3.

8. The mixture as claimed in claim 1, wherein a total content of compounds of the formula (I), (II) and (III) is at least 5.0 wt. %, based on the total weight of the mixture.

9. The mixture as claimed in claim 1, which comprises at least one monomer (A) which is copolymerizable with the prepolymers prepared from the monomers of the formulae (I), (II) and (III).

10. The mixture as claimed in claim 9, which comprises di(meth)acrylates.

11. The mixture as claimed in claim 1, which comprises styrene as aromatic vinyl compounds.

12. The mixture as claimed in claim 1, which comprises allylpolyethylene glycol methacrylate.

13. The mixture as claimed in claim 1, which comprises at least one ethylenically unsaturated monomer (B).

14. The mixture as claimed in claim 13, which comprises 2-hydroxyethyl methacrylate.

15. A process for the production of transparent plastics, comprising polymerizing a mixture as claimed in claim 1.

16. A transparent plastic obtained by a process as claimed in claim 15.

17. The plastic as claimed in claim 16, wherein a refractive index of the plastic according to DIN 53491 is greater than 1.59.

18. The plastic as claimed in claim 16, wherein an Abbé number of the plastic according to DIN 53491 is greater than 36.

19. The plastic as claimed in claim 16, wherein a mean value of the diameter of a ball which does not damage a test specimen in a falling ball test is $\geq 18$.

20. The plastic as claimed in claim 16, wherein a transmission of the plastic according to DIN 5036 is $\geq 89\%$.

21. The plastic as claimed in claim 16, having a glass transition temperature of greater than 80.0° C.

22. A mixture, containing:
(a) a mixture as claimed in claim 1; and
(b) at least one photochromic dye.

23. A photochromic material, comprising: a mixture as claimed in claim 22.

24. A method of using a photochromic material, comprising:
incorporating said photochromic material as claimed in claim 23 in a lens or a glass pane or a glass insert.

25. A method of using a transparent plastic, comprising: incorporating said transparent plastic as claimed in claim 16 in an optical lens.

26. An optical lens, comprising: a transparent plastic as claimed in claim 16.

27. A lens, a glass pane or a glass insert, comprising: the photochromic material as claimed in claim 23.

28. The mixture as claimed in claim 1, wherein component d) is present.

29. The mixture as claimed in claim 1, wherein component f) is present.

* * * * *

UNITED STATES PATENT AND TRADEMARK OFFICE
CERTIFICATE OF CORRECTION

PATENT NO. : 7,419,619 B2 Page 1 of 1
APPLICATION NO. : 10/588210
DATED : September 2, 2008
INVENTOR(S) : Schmitt et al.

It is certified that error appears in the above-identified patent and that said Letters Patent is hereby corrected as shown below:

On the title page, the Terminal Disclaimer information has been omitted. Item (45) and the Notice information should read:

-- (45) Date of Patent:   * Sep. 2, 2008

(*)   Notice: Subject to any disclaimer, the term of this patent is extended or adjusted under 35 U.S.C. 154(b) by 0 days.

This patent is subject to a terminal disclaimer. --

Signed and Sealed this

Sixteenth Day of December, 2008

JON W. DUDAS
*Director of the United States Patent and Trademark Office*